N. A. LOCKE.
ANTIRATTLING JOINT FOR STEERING GEARS.
APPLICATION FILED DEC. 13, 1916.

1,278,362.

Patented Sept. 10, 1918.

INVENTOR
Nathan A. Locke
BY
Parsons & Bodell
ATTORNEYS

UNITED STATES PATENT OFFICE.

NATHEN A. LOCKE, OF FULTON, NEW YORK.

ANTIRATTLING JOINT FOR STEERING-GEARS.

1,278,362. Specification of Letters Patent. Patented Sept. 10, 1918.

Application filed December 13, 1916. Serial No. 136,776.

*To all whom it may concern:*

Be it known that I, NATHEN A. LOCKE, of Fulton, in the county of Oswego, in the State of New York, have invented a certain new and useful Antirattling Joint for Steering-Gears, of which the following is a specification.

This invention has for its object the production of an anti-rattling joint which is particularly simple in construction and highly efficient and durable in use, and which is particularly adapted for coupling the connecting rod with the spindle arms of the steering gear of a motor vehicle; and the invention consists in the novel features and in the combinations and constructions hereinafter set forth and claimed.

In describing this invention, reference is had to the accompanying drawings in which like characters designate corresponding parts in all the views.

Figure 1:
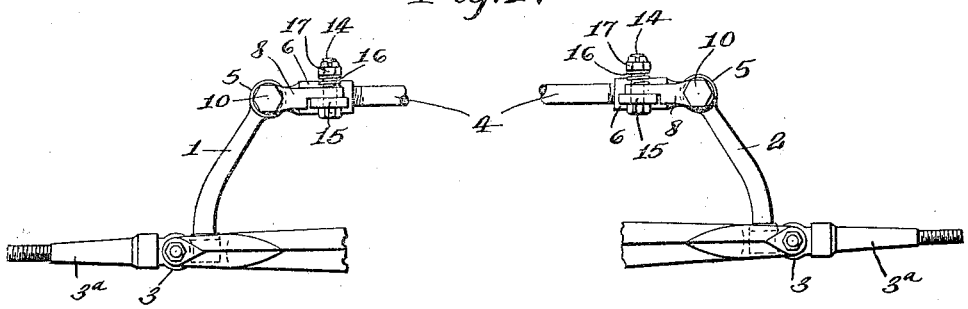
Figure 1 is a plan view, partly broken away, of the front axle of a motor vehicle, and a portion of the steering gear embodying my invention.
Figure 2:
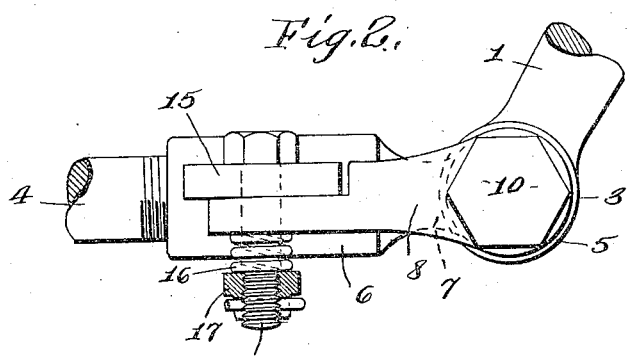
Fig. 2 is an enlarged plan view of one of the joints shown in Fig. 1.
Figure 3:
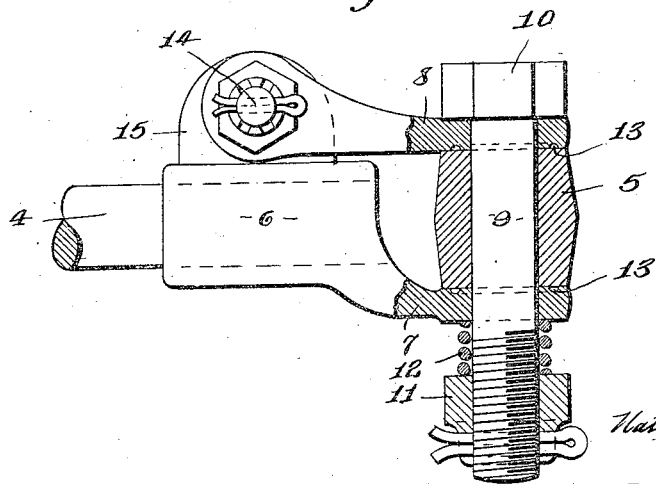
Fig. 3 is an elevation, partly in section, of parts seen in Fig. 2.

This anti-rattling joint comprises generally, a bearing provided on one of two members as the spindle arm or rock arm of a steering gear, a yoke provided on the other of said two members, the yoke having arms lapping the ends of the bearing and one of the yoke arms being movable, a spindle extending through the yoke arms and the bearing, and a spring acting in an endwise direction on the spindle and tending to hold the movable yoke arm snugly against the bearing and the bearing snugly against the fixed yoke arm. The joint also includes means for automatically taking up any looseness in the joint between the movable yoke arm and the body of the yoke.

1 and 2 designate respectively the right and left spindle arms of the steering knuckle of a motor vehicle, each of which arms is rigid with a substantially vertical bearing 3 pivoted to the yoke at each end of the axle and carrying a wheel spindle 3ª in the well known manner.

4 designates the connecting rod between the right and left spindle arms 1, 2, each spindle arm 1, 2 being formed with a substantially vertical bearing 5 at its end and the connecting rod 4 is provided at each end with a yoke including a body or sleeve 6 mounted on each end of the rod 4 and fixed and movable yoke arms 7, 8 carried by the body 6 and lapping the lower and upper end faces of the bearing 5, the fixed arm being located at the lower end of said bearing.

9 designates a spindle extending through the arms 7, 8, and the bearing 5, and having heads 10 and 11 thereon. 12 designates a coiled compression spring encircling the spindle and interposed between one of the yoke arms and one of the heads of the spindle, it being here shown as interposed between the lower fixed yoke arm 7 and the head 11. As here shown this spindle is a bolt and the head 11 is the nut screwing thereon. The portions of the arms lapping the ends of the bearing 5 are provided with suitable oil grooves 13 concentric with the axis of the bearing 5.

The upper movable yoke arm is here shown as pivoted to the yoke body on a pivot extending in a plane at a right angle to a plane containing the axis of the spindle 9, that is, said axis extends horizontally and the movable yoke arm 8 is here shown as pivoted at 14 to a lug 15 extending vertically from the upper side of the body 6. The yoke arm 8 and the lug have faces which lie against each other, and which are held snugly engaged by means of a spring 16. As here shown, this spring 16 encircles the pivot which is a bolt, and is interposed between the yoke arm 8 and the nut 17 on said bolt.

In operation, owing to the spring 12 and the movable yoke arm 8, wear between the ends of the bearing 5 and the yoke arms 7, 8 is automatically taken up, and thus looseness and rattling avoided, and likewise any looseness and rattling is avoided between the movable yoke arm 8 and the yoke body by the use of the spring 16.

This anti-rattling joint is particularly advantageous in that it is particularly simple in construction and readily applicable to standard forms of automobiles and particularly to Ford cars.

What I claim is:

1. An anti-rattling pivoted joint comprising a member having a bearing, a yoke having arms lapping opposite ends of the bearing, a spindle extending through the yoke arms and the bearing, and having heads at its opposite ends, one of the heads being spaced apart from the opposing yoke arm, a spring interposed between said head and the opposing yoke arm and one of the yoke arms being movably mounted on the yoke body, and means for securing the movable yoke arm to the yoke body including a spring acting on the joint between the movable yoke arm and the yoke body to take up looseness in such joint, substantially as and for the purpose set forth.

2. An anti-rattling pivoted joint comprising a member having a bearing, a yoke having arms lapping opposite ends of the bearing, a spindle extending through the yoke arms and the bearing and having heads at its opposite ends, one of the heads being spaced apart from one of the yoke arms, a spring interposed between said head and the opposing yoke arm, one of the yoke arms being pivoted to the yoke body on an axis extending in a direction at right angles to the axis of the spindle, a pivot connecting said pivoted arm to the yoke body and having heads at its opposite ends and a spring acting on the pivot endwisely, substantially as and for the purpose described.

3. In a steering gear the combination of two elements, one a rock arm and the other a rod, a joint connecting the arm and the rod including a bearing on one of said elements, a yoke on the other of said elements and including a movable arm, a spindle extending through the yoke arms and the bearing, means tending to automatically move the spindle endwise and means for holding the movable arm from loosening relatively to the point at which it is supported, substantially as and for the purpose described.

4. In a steering gear, the combination of two elements, one a rock arm and the other a rod, a joint connecting the arm and the rod including a bearing on one of said elements, a yoke on the other of said elements and including a pivoted arm, a pin extending through the yoke arms and the bearing, and means tending to automatically move the spindle endwise, and means for taking up looseness at the pivoted joint of the movable yoke arm, substantially as and for the purpose specified.

In testimony whereof, I have hereunto signed my name, at Fulton, in the county of Oswego, in the State of New York, this 26th day of October, 1916.

NATHEN A. LOCKE.

Copies of this patent may be obtained for five cents each, by addressing the "Commissioner of Patents, Washington, D. C."